April 16, 1968     T. W. KUCHARSKI ET AL     3,377,655

EXTRUSION DIE

Filed March 2, 1966

INVENTORS
THADDEUS W. KUCHARSKI
FREDERICK H. THOMAS
VERNON K. QUARVE

BY *Walter O. Anderson*
    *Charles L. Good* ATTORNEYS

United States Patent Office 3,377,655
Patented Apr. 16, 1968

3,377,655
EXTRUSION DIE
Thaddeus W. Kucharski and Frederick H. Thomas, Rochester, N.Y., and Vernon K. Quarve, Minneapolis, Minn., assignors, by direct and mesne assignments, to Eastman Kodak Company, Rochester, N.Y., a corporation of New Jersey
Filed Mar. 2, 1966, Ser. No. 531,117
3 Claims. (Cl. 18—12)

ABSTRACT OF THE DISCLOSURE

Extrusion die assembly for continuously extruding a sheet of molten thermoplastic material having at least one flexible die lip held in extruding position by a rotatable cam means having at least two radially different cam positions so as to provide different degrees of flexure, one of said cam positions being such that the die opening is large enough to permit removal of solids which interfere with the extrusion of a smooth sheet.

---

This invention relates to an extrusion die and, more particularly, it relates to an extrusion die for forming a molten thermoplastic material into an extruded sheet.

In the preparation of sheets, films, coating, and other pellicular forms from thermoplastic molding materials, a die is frequently used which has an extrusion orifice in the form of a long, rectangular slot, the length of which generally determines the width of the sheet and the width of which determines the thickness of the sheet. As larger and larger sheets or films have become commercially attractive, it has become necessary to extend the length of the extrusion die to such dimensions that it is extremely difficult to maintain a uniform thickness, or caliper, in the extruded sheet. This is due, in part, to the necessity of forming the extrusion orifice from two long, integral pieces of metal which inherently become flexible and more easily distorted as the length is made greater and greater. These problems of flexibility and distortion are amplified by the effects of heat on the expansion and contraction of the metal die lips, and by the variations in pressure produced by the molten material inside the die. As a result it has become necessary to provide individually operable means of adjustment along the length of the die lips to make it possible to extrude a wide sheet having substantially the same caliper across its entire width.

The extrusion die which terminates in such a long die orifice must, necessarily, be massive with substantially rigid supporting structure to maintain the adjustments over long periods of operation. A typical die of this type is described in U.S. Patent 2,686,931 which issued to K. L. Knox on Aug. 24, 1954. Such an extrusion die is designed especially for the continuous production of self-supporting film since it will maintain its caliper adjustment over long periods of production, and will permit extremely fine adjustments. Thus, films which are only a fraction of 1 mil in thickness are readily produced from such a die.

The small calipers mentioned above make it absolutely necessary that the molten plastic material be thoroughly purified and cleaned to free it entirely of any foreign substances which might clog the extremely small die orifice. The precautionary measures which are frequently employed for this purpose include cleaning and filtering of the molding granules prior to feeding them into an extruder, and the employment of filtering devices, such as screen packs, inside the extruder to remove from the molten plastic all solid particles, whether they be foreign objects or incompletely melted granules of the plastic. These cleaning and filtering procedures add to the manufacturing expenses, and while this is justified for the manufacture of high quality film, it is not justified in the manufacture of the sheet materials employed in connection with this invention.

In the packaging of small articles by the curtain coating process, a molten sheet is extruded which must be reasonably, but not minutely, uniform in caliper over the entire area of the sheet. Furthermore, the process inherently is subject to the possibility of solid particles appearing at the die orifice to interfere with the production of a smooth sheet which is needed in the curtain coating process. In this packaging process, articles such as small toys, utensils, hardware, foods, and the like are mounted on a supporting substrate, e.g., a piece of paperboard, and the entire upwardly facing surfaces of the substrate and of the articles on the substrate are covered with a thin blanket of a thermoplastic material which hardens upon cooling and thereby binds the article to the supporting substrate. In this process a recycling system collects any excess of extruded thermoplastic material, e.g., that trimmed from a package prepared by this process or that which fell beyond the edge of a substrate during the coating operation, and returns that excess material back to the extrusion head. It is inevitable that in such a recycling system particles of dust and dirt, pieces of the substrate, and unmelted particles of the thermoplastic material will appear at the extrusion orifice to cause blockage or to produce mars in the extruded coating. Since it is extremely important for this process to be inexpensive and to employ uncomplicated machinery, it is highly desirable to provide an extrusion die which can quickly be freed of any solid particles in its orifice and normal extrusion operations can be quickly reinstated.

It is an object of this invention to provide an improved extrusion die.

It is another object of this invention to provide an extrusion die which can quickly be cleared of any solids in its orifice.

It is still another object of this invention to provide an extrusion die having a means for quickly opening the extrusion orifice and quickly returning it to normal extrusion operation.

Other objects will appear from the more detailed description of this invention which follows.

The foregoing objects are accomplished in accordance with this invention by providing an extrusion die assembly for normally extruding a continuous sheet of molten thermoplastic material, comprising a substantially rectangularly-shaped die orifice defined by a pair of elongated side members and a pair of end members, at least one of said elongated side members being sufficiently flexible to be forced into or out of a normal extrusion position relative to the other of said elongated side members, and a means for instantaneously enlarging said slot to an abnormal width to permit removal of solids from said orifice which interfere with the extrusion of a smooth sheet, and for instantaneously reducing said slot to a normal extrusion width. In the preferred embodiment of this invention, the means for instantaneously enlarging the slot width and instantaneously reducing it to an extrusion width is a rotatable cam means which cooperates with the elongated side members to set the slot width at the proper size for extruding a sheet and to set the slot width at a greatly enlarged size, which is sufficiently enlarged to permit the removal of undesirable solids in the extrusion orifice.

The details of the operation of the extrusion die of this invetnion may be more readily understood by reference to the attached drawings.

Figure 1:
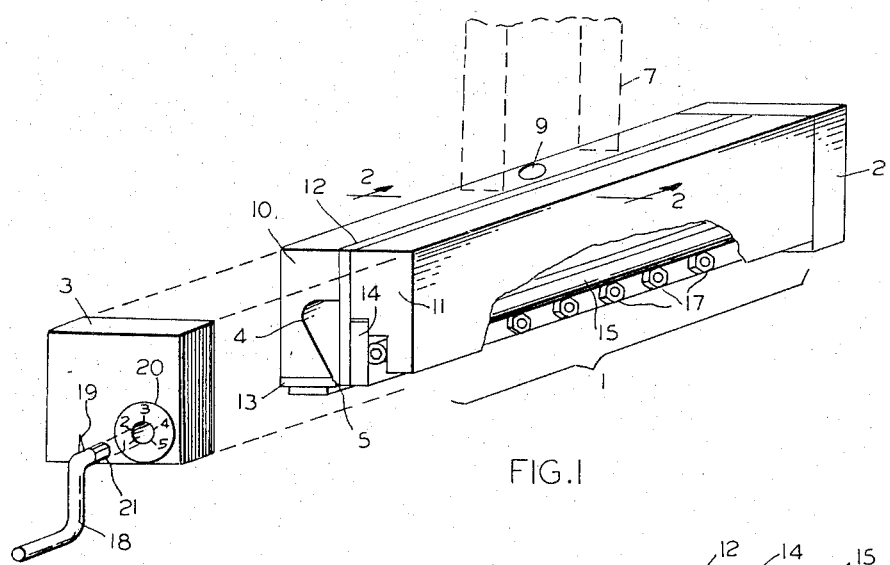
FIGURE 1 is an exploded, isometric view of the extrusion device of this invention.

In FIGURE 1 there is illustrated the main extrusion die body assembly 1 fitted with rear end plate 2 and forward end plate 3. The extrusion die body assembly 1 has a lengthwise die cavity 4 narrowing to a lengthwise rectangular slot-shaped extrusion orifice 5. Molten thermoplastic material is fed under high pressure into die cavity 4 and extruded through die orifice 5 in the form of a sheet or film. The molten thermoplastic material is supplied by any convenient device for receiving solid thermoplastic material, melting it, and causing it to flow under pressure as a molten mass into die cavity 4. A satisfactory device for supplying such material is a screw extruder which may be attached to the extrusion device of this invention at any convenient location which permits communication with die cavity 4. One desirable method of attachment is for extruder 7 to be attached so that its outlet is at the approximate midpoint between end plates 2 and 3. This minimizes the pressure differential on the molten thermoplastic material in die cavity 4. In this attachment extruder 7 may be mounted vertically (as shown) or horizontally by making inlet 9 in the appropriate direction. Extruder 7 may also be attached "in line" so as to feed molten material through rear end plate 2 in one end of die cavity 4.

The extrusion die body assembly 1 is made up of die cavity member 10, die blade support 11, flexible die blade 12, horizontal die blade 13, cam pressure plate 14, and cam shaft 15. The fine adjustment of die orifice 5 may be accomplished in accordance with one embodiment of this invention by screw adjusters 17 located at spaced positions along the length of flexible die blade 12. Cam shaft 15 is turned manually by crank 18 having a splined or hexagonal head 21 made to fit a corresponding female connection at the end of cam shaft 15. Crank 18 may be fitted with a pointer 19 to cooperate with a position indicator 20 on forward end plate 3 so that the extrusion die operator will know whether the die orifice 5 is open or closed.

Figure 2:
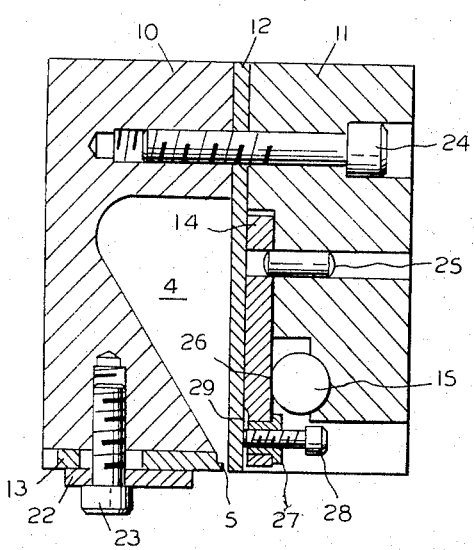
FIGURE 2 is a cross-sectional view of the extrusion device taken along plane 2—2 in FIGURE 1.

In FIGURE 2, the details of the extrusion die body assembly 1 may be seen more readily. Die cavity member 10, die blade support 11, and flexible die blade 12 are rigidly fixed to each other by a multiplicity of screws 24. Die cavity 4 is desirably shaped in the form of an inverted pear so as to provide a large volume in its upper portion and a narrowing, smooth, streamlined form as it approaches die orifice 5. The lower surface of die cavity member 10 is fitted with an adjustable, horizontal die blade 13 which is held in place by clamping member 22 and a series of screws 23. In the embodiment shown in FIGURE 2, the adjustment of die blade 13 is intended to provide a gross adjustment of the width of die orifice 5 while the fine adjustment is provided by means attached to flexible die blade 12. Cam pressure plate 14 provides support behind flexible die blade 12, which is flexible, but much less so than is die blade 12. In certain embodiments of this invention cam pressure plate 14 may be omitted. At the lower extremity of cam pressure plate 14 there is an undercut 29 to cooperate with a screw means for fine adjustment of die orifice 5. The screw adjustment means comprises a nut 27 and adjusting screw 28 which bears against the lower portion of flexible die blade 12 and flexes the blade slightly toward the near edge of horizontal die blade 13. The combinatin of nut 27 and screw 28 in FIGURE 2 comprises the assembly identified generally as screw adjusters 17 in FIGURE 1. The pressure which is applied by adjusting screws 28 not only flexes die blade 12 in the direction of horizontal die blade 13, but also applies a certain amount of flexing pressure in the opposite direction to cam pressure plate 14 and thereby provides a tight fit between cam 15 and cam pressure plate 14 at the point of contact 26. Cam pressure plate 14 is maintained in a fixed relationship to die blade support 11 by a series of dowels 25. By the appropriate adjustments of horizontal die blade 13 and flexible die blade 12, die orifice 5 can be made to assume any desired shape and dimension along its length from a fraction of a 0.001" (1 mil) to a dimension of considerably greater size which in certain instances could be several times larger than the normal extrusion width. In its normal operation, however, die orifice 5 is set so that when cam 15 is in its closed position, flexible die blade 12 is urged as far toward horizontal die blade 13 as will be necessary for normal sheet making operation through the extrusion orifice 5.

In certain instances it may be desirable to eliminate cam pressure plate 14 and to permit cam shaft 15 to bear directly on the rear surface of flexible die blade 12. This arrangement necessitates the elimination of screw adjustment means comprising screw 28 and nut 27 from die blade 12. These adjustment means can be affixed to die blade 13 or eliminated entirely depending on many design considerations.

Figure 3:
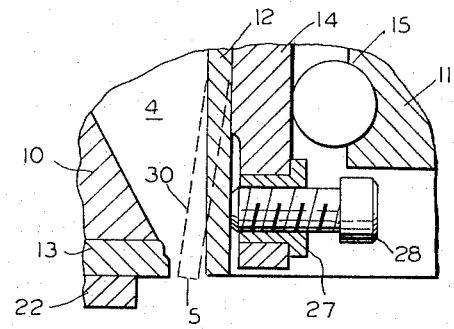
FIGURE 3 is an enlarged portion of the extrusion orifice of FIGURE 2 with the orifice in the open position.

In FIGURE 3, there is shown an enlarged view of die orifice 5 which is in its widest opened position due to the rotation of cam shaft 15 to the appropriate position. By rotating cam shaft 15 approximately 90° in a counterclockwise direction, cam pressure plate 14 and flexible die blade 12 will return to their normal operating position as shown by dotted lines 30.

Figure 4:
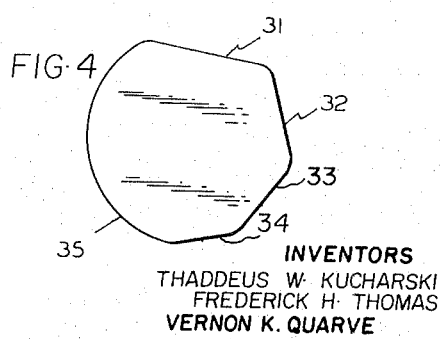
FIGURE 4 is an enlarged plan view of the cam employed to open and close the extrusion orifice.

In FIGURE 4, there is an enlarged drawing of the possible shape of the bearing surface of cam shaft 15. In accordance with this invention, the cam means will always have at least two positions, namely, an open position and a closed position denoting, respectively, the position giving the die orifice 5 its greatest opening and the position giving die orifice 5 its smallest opening. As many additional intermediate positions between these two extremes may be employed as is desirable. The configuration shown in FIGURE 4 employs open position 31, closed position 35, and three intermediate positions between open and closed positions, namely, positions 32, 33, and 34.

Although the invention has been described in considerable detail with reference to certain preferred embodiments thereof, it will be understood that variations and modifications can be effected within the spirit and scope of the invention as described hereinabove and as defined in the attached claims.

What is claimed is:

1. An extrusion die assembly for normally extruding a continuous sheet of molten thermoplastic material, comprising a substantially rectangularly-shaped die orifice defined by a pair of elongated side members and a pair of end members, at least one of said elongated side members being sufficiently flexible to be forced into or out of a normal extrusion position relative to the other of said elongated side members, and a means for instantaneously enlarging said slot to an abnormal width to permit removal of solids from said orifice which interfere with the extrusion of a smooth sheet, and for instantaneously reducing said slot to a normal extrusion width, said means comprising a rotatable, axially mounted, cam means cooperating with said flexible elongated side member, said cam means having at least two radially different cam positions adapted to provide different degrees of flexure in said side member so as to provide different slot widths, one of said cam positions being adapted to provide an abnormally enlarged slot width to permit removal of solids which interfere with the extrusion of a smooth sheet.

2. The extrusion die assembly of claim 1, wherein one of said elongated side members is flexible and fitted with means to provide adjustment of the slot width, and also is fitted with said cam means.

3. The extrusion die assembly of claim 1, wherein one of said elongated side members is flexible and is fitted with said cam means, and the other of said elongated side members is fitted with means to provide fine adjustment of the slot width.

References Cited
UNITED STATES PATENTS

| | | | |
|---|---|---|---|
| 2,218,751 | 10/1940 | Humphrey | 18—1 |
| 2,793,598 | 5/1957 | Revocke | 18—12 |
| 2,910,724 | 11/1959 | Grajeck | 18—12 |
| 3,019,746 | 2/1962 | Cunningham | 18—12 |
| 3,112,527 | 12/1963 | Pankratz et al. | 18—1 |
| 3,122,789 | 3/1964 | Coffee | 18—1 |
| 3,195,183 | 7/1965 | Phillips | 18—1 |
| 3,268,950 | 8/1966 | Rankin | 18—1 |
| 3,292,211 | 12/1966 | Strange | 18—1 |

WILLIAM J. STEPHENSON, *Primary Examiner.*